United States Patent
Minami

(10) Patent No.: US 8,508,706 B2
(45) Date of Patent: Aug. 13, 2013

(54) LIQUID CRYSTAL DISPLAY DEVICE AND METHOD OF MANUFACTURING THE SAME

(75) Inventor: Akira Minami, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 115 days.

(21) Appl. No.: 13/109,353

(22) Filed: May 17, 2011

(65) Prior Publication Data

US 2011/0285954 A1   Nov. 24, 2011

(30) Foreign Application Priority Data

May 19, 2010   (JP) .................................. 2010-115600

(51) Int. Cl.
*G02F 1/1339* (2006.01)
(52) U.S. Cl.
USPC .......................................... 349/153; 349/190
(58) Field of Classification Search
None
See application file for complete search history.

(56) References Cited

U.S. PATENT DOCUMENTS

| | | | |
|---|---|---|---|
| 2005/0094088 A1* | 5/2005 | Kao et al. ...................... | 349/190 |
| 2009/0231534 A1* | 9/2009 | Morita .......................... | 349/153 |
| 2010/0002182 A1* | 1/2010 | Lee et al. ..................... | 349/154 |

FOREIGN PATENT DOCUMENTS

JP   6-160871   6/1994

* cited by examiner

*Primary Examiner* — Thanh-Nhan P Nguyen
(74) *Attorney, Agent, or Firm* — Oblon, Spivak, McClelland, Maier & Neustadt, L.L.P.

(57) ABSTRACT

In one embodiment, a liquid crystal display device includes a first substrate and second substrate opposing the first substrate. A seal material is formed on the first substrate to attach the first substrate and second substrate with a predetermined cell gap therebetween. The seal material is formed in an approximately rectangular closed loop shape having four straight line portions. The straight line portion includes an expanded portion in which the width of one of the straight line portions is locally expanded. A barrier is arranged between the location where the expanded portion is formed and one end of the first substrate.

11 Claims, 8 Drawing Sheets

LIQUID CRYSTAL DISPLAY DEVICE AND METHOD OF MANUFACTURING THE SAME

CROSS-REFERENCE TO RELATED APPLICATION

This application is based upon and claims the benefit of priority from Japanese Patent Application No. 2010-115600, filed May 19, 2010, the entire contents of which are incorporated herein by reference.

FIELD

Embodiments described herein relate generally to a liquid crystal display device and a method of manufacturing the same.

BACKGROUND

Liquid crystal display devices are widely used as display devices for various kinds of equipments such as personal computers, OA equipments, and TV sets because the liquid crystal display devices have many advantages such as lightness, compactness and low power consumption. In recent years, the liquid crystal display device has also been used in mobile terminal equipments such as a mobile phone, a car navigation device and a game player.

In recent years, ODF (One Drop Fill) method is put in practical use as one of the techniques of forming a liquid crystal display panel. In such ODF method, a seal material is formed so that a closed loop may be formed. When the seal material is provided by a process which draws from a starting portion to terminal portion, it is required that the seal material may not be disconnected between the starting portion and terminal portion.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
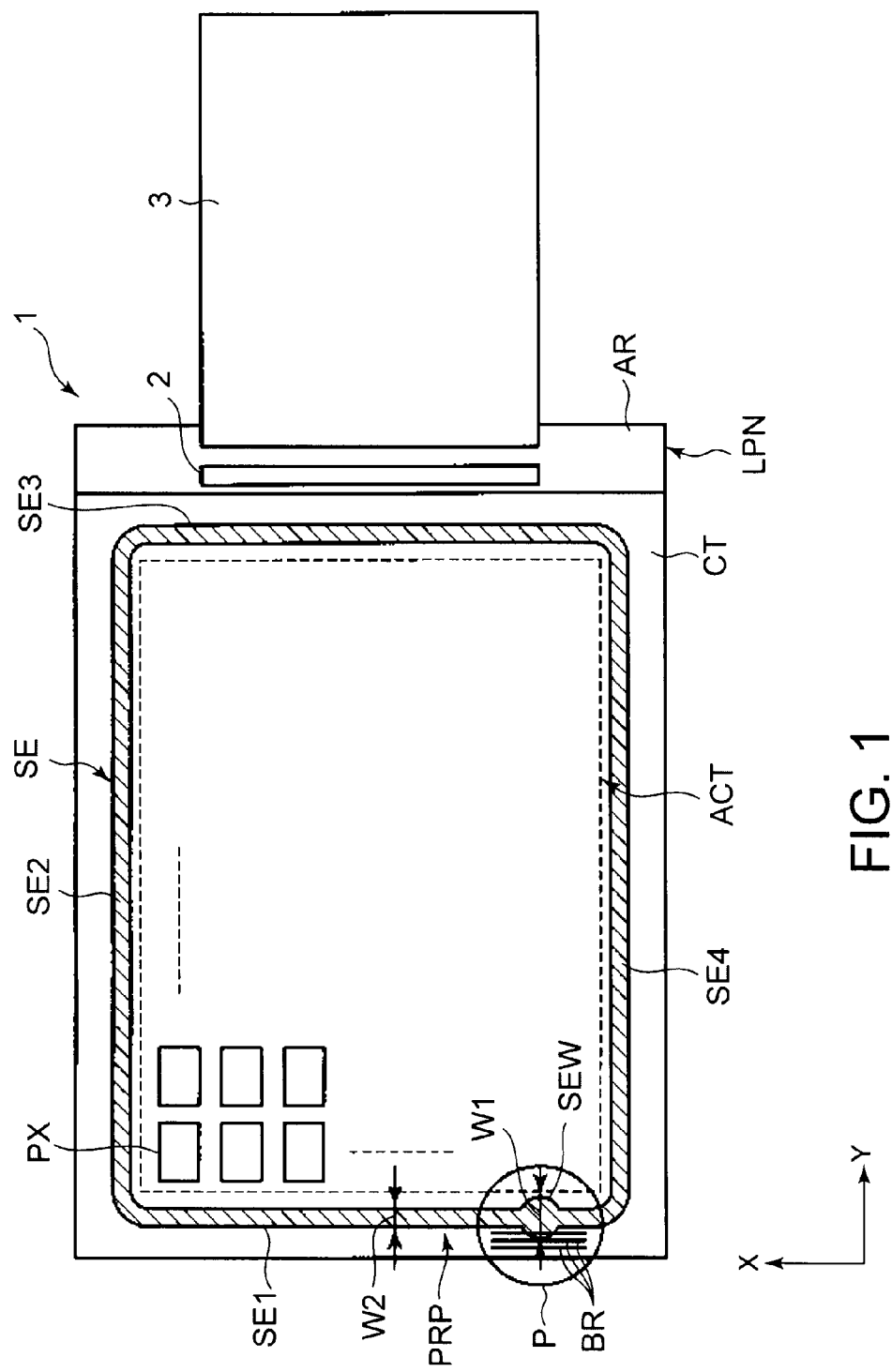
FIG. 1 is a plan view schematically showing the structure of a liquid crystal display device according to an embodiment.

A liquid crystal device and a method of manufacturing the same according to an exemplary embodiment of the present invention will now be described with reference to the accompanying drawings wherein the same or like reference numerals designate the same or corresponding portions throughout the several views.

According to one embodiment, a liquid crystal display device includes a first substrate; a second substrate opposing the first substrate; a seal material formed on the first substrate to attach the first substrate and second substrate with a predetermined cell gap therebetween, the seal element formed in an approximately rectangular closed loop shape having four straight line portions and including an expanded portion in which the width of one of the line portions is locally expanded; and a barrier arranged between the location where the expanded portion is formed and one end of the first substrate.

According to other embodiment, a method of manufacturing a liquid crystal display device includes the steps: preparing a first substrate including an insulating substrate, an insulating film formed on the insulating substrate, a pillar-shaped spacer formed on the insulating film in an active area to display image, and a barrier formed on the insulating film in a peripheral area located outside of the active area; drawing a seal material to form an approximately rectangular closed loop shape on the first substrate by setting a position between the barrier and active area to a starting portion and terminate portion of the drawing; dropping liquid crystal material in an inside area surrounded with the seal material; arranging the second substrate on the seal material and the liquid crystal material; and attaching the first and second substrates by curing the seal material while holding the liquid crystal material therebetween.

FIG. 1 is a plan view schematically showing the structure of a liquid crystal display device 1 according to an embodiment. The liquid crystal display device 1 includes an active-matrix type liquid crystal display panel LPN, a driver IC chip 2 and a flexible wiring substrate 3, etc. connected to the liquid crystal display panel LPN.

The liquid crystal display panel LPN includes an array substrate AR as a first substrate, a counter substrates CT as a second substrate facing the array substrate AR, and a liquid crystal layer (which is not illustrated) held between the array substrate AR and counter substrates CT. The array substrate AR and counter substrates CT are attached together by a seal material SE. The liquid crystal layer is held at the inner side surrounded by the seal material SE in a cell gap formed between the array substrate AR and counter substrate CT.

The liquid crystal display panel LPN includes an active area ACT of the shape of an approximately rectangle for displaying an image at the inner side surrounded by the seal material SE. The active area ACT is constituted by a plurality of pixels PX arranged in the shape of (m×n) matrix (here, m and n are positive integers). The driver IC chip 2 and flexible wiring substrate 3 are mounted on the array substrate AR in a peripheral area PRP outside the active area ACT.

In this embodiment, between the array substrate AR and counter substrate CT, the seal material SE is formed in the shape of an approximately rectangle frame, while making a closed loop. That is, an injecting mouth for injecting liquid crystal material into the gap between the array substrate AR and counter substrate CT is not formed in the seal material SE. The seal material SE has four straight line portions, i.e., the first to fourth straight line portions SE1 to SE4. In the illustrated example, the first straight line portion SE1 and third straight line portion SE3 extend in a first direction X, and the second straight line portion SE2 and fourth straight line portion SE4 extend in a second direction Y that intersects perpendicularly with the first direction X.

Moreover, the seal material SE has an expanded portion SEW in which a line width is expanded locally. In the illustrated example, the seal material SE has the expanded portion SEW in the first straight line portion SE1. The line width W1 (length in the second direction Y) of the expanded portion SEW is expanded rather than the line width W2 of the first straight line portion SE1. The line width W2 of the first straight line portion SE1 other than the expanded portion SEW is approximately uniform, and each line width of the second to fourth straight line portions SE2 to SE4 is approximately same as the line width W2 of the first straight line portion SE1.

The seal material SE is formed with a UV-curable resin etc., and is disposed by a system which draws from a starting portion to terminal portion using a dispenser device, etc. In case such system is applied, the seal material SE is formed so that the seal material SE may not be disconnected between the starting portion and terminal portion. For this reason, the seal material SE disposed at the starting portion and terminal portion is piled up.

For example, when drawing the seal material SE, the drawing of the seal material is first started from the starting portion. After forming a portion of the first straight line portion SE1, then the second straight line portion SE2 and third straight line portion SE3 are successively formed. Then, after forming the fourth straight line portion SE4, other portions of the first straight line portion SE1 are formed. The terminal portion corresponds to the position which overlaps the starting portion, or the position beyond the starting portion.

Thus, in case the seal material SE is drawn, the seal material SE is piled up near the starting portion and terminal portion. In such overlapped portion of the seal material SE, the amount of the disposed seal material increases more than the seal material disposed on other portions. Accordingly, when the array substrate AR and counter substrate CT are attached together, the line width at the overlapped portion is expanded than other portions. The position of above-mentioned expanded portion SEW corresponds to the overlapped starting portion and terminal portion at the time of drawing the seal material SE. That is, the expanded portion SEW corresponds to the overlapped portion of the seal material SE.

According to a first embodiment, the liquid crystal display panel LPN is further equipped with a barrier BR in the peripheral area PRP. Rather than the position in which the seal material SE is formed, the barrier BR is located closer to an end side of the liquid crystal display panel LPN, and is arranged corresponding to the expanded portion SEW of the seal material SE. A region P including the barrier BR and the expanded portion SEW will be explained in detail later.

Figure 2:
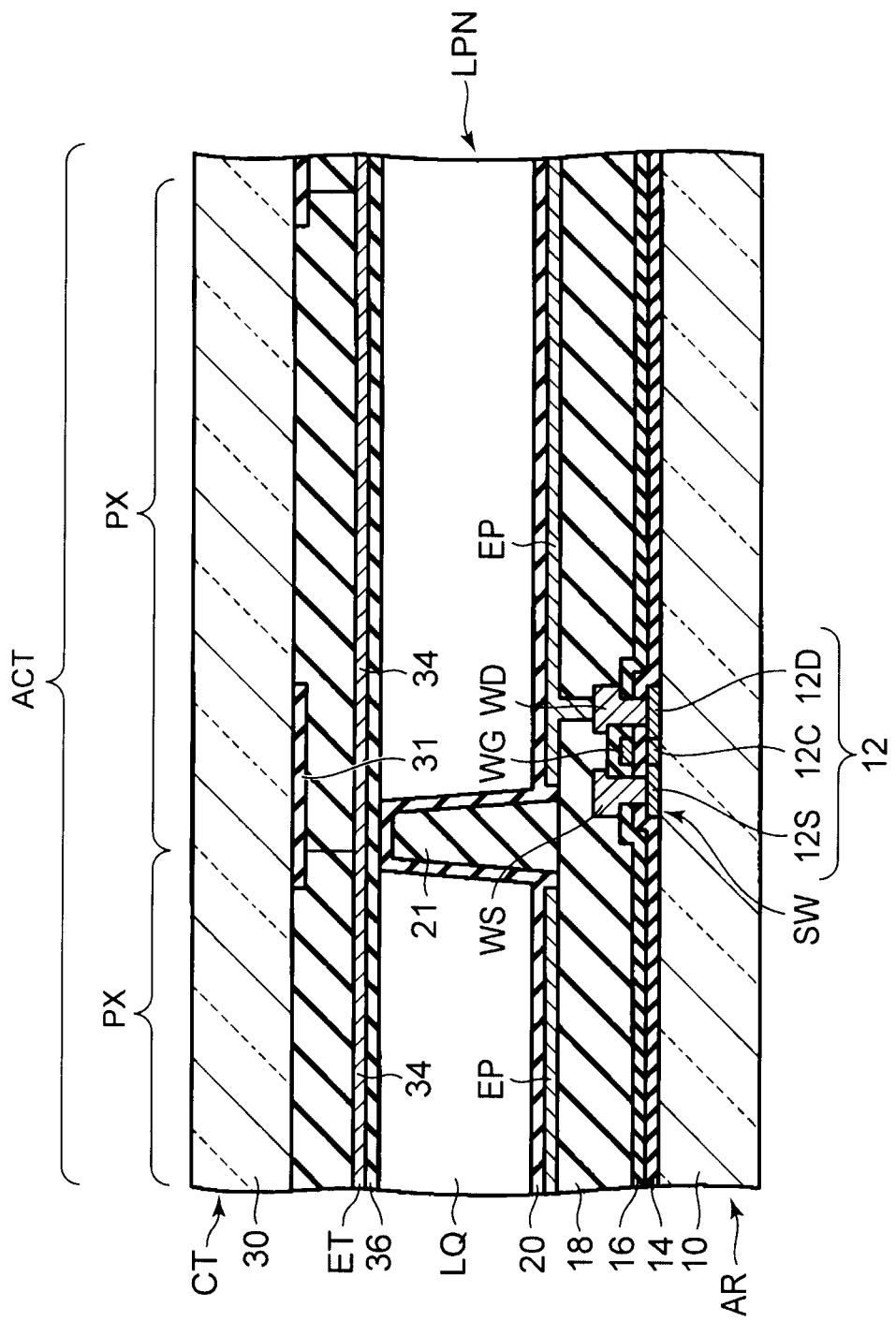
FIG. 2 is a cross-sectional view schematically showing the structure of an active area in the liquid crystal display panel shown in FIG. 1.

FIG. 2 is a cross-sectional view schematically showing the structure in the active area ACT of the liquid crystal display panel LPN shown in FIG. 1. That is, the array substrate AR to constitute the liquid crystal display panel LPN is formed using the first transmissive insulating substrate 10, such as a glass substrate, etc. The array substrate AR includes a switching element SW, a pixel electrode EP, etc. formed on the first insulating substrate 10 opposing the counter substrate CT. Although the switching element SW shown here is a thin film transistor of a top gate type, the structure is not limited to that shown here.

The switching element SW includes a semiconductor layer 12 arranged on the first insulating substrate 10. The semiconductor layer 12 may be formed by poly-silicon, an amorphous silicon, etc. Here, poly-silicon is used, for example. The semiconductor layer 12 has a source region 12S and drain region 12D on both sides which contact with a channel region 12C, respectively. The semiconductor layer 12 is covered with a gate insulating film 14. The gate insulating film 14 is also arranged on the first insulating substrate 10. In addition, although not illustrated, an undercoat layer formed with an insulating film may be formed between the first insulating substrate 10 and the semiconductor layer 12.

The gate electrode WG of the switching element SW is arranged on the gate insulating film 14, and is located right above the channel region 12C of the semiconductor layer 12. The gate electrode WG is covered with a first interlayer insulating film 16. The first interlayer insulating film 16 is arranged also on the gate insulating film 14.

The source electrode WS and drain electrode WD of the switching element SW are arranged on the first interlayer insulating film 16. The source electrode WS is in contact with the source region 12S of the semiconductor layer 12 through a contact hole which penetrates the gate insulating film 14 and first interlayer insulating film 16. The drain electrode WD is in contact with the drain region 12D of the semiconductor layer 12 through a contact hole which penetrates the gate insulating film 14 and first interlayer insulating film 16.

The source electrode WS and drain electrode WD are covered with a second interlayer insulating film 18. The second interlayer insulating film 18 is arranged also on the first interlayer insulating film 16. The second interlayer insulating film 18 is formed of various resin materials, such as UV-curable resin and thermosetting resin.

The pixel electrode EP is arranged in the active area ACT in each pixel PX. That is, the pixel electrode EP is arranged on the second interlayer insulating film 18, and is electrically connected with the drain electrode WD through a contact hole formed in the second interlayer insulating film 18. The pixel electrode EP is covered with a first alignment film 20.

On the other hand, the counter substrate CT to constitute the liquid crystal display panel LPN is formed using a transmissive second insulating substrate 30, such as a glass substrate, etc. The counter substrate CT includes a shield layer 31, a color filter layer 34, a counter electrode ET, etc. formed on the second insulating substrate 30 opposing the array substrate AR.

The shield layer 31 is arranged between adjacent pixels PX in the active area ACT. The shield layer 31 is arranged on the second insulating substrate 30, and faces various wiring portions, such as the switching element SW, gate line and source line formed on the array substrate AR, which are not illustrated. The color filter layer 34 is arranged in each pixel PX in the active area ACT. The color filter layer 34 is arranged on the second insulating substrate 30, and a portion of the color filter layer 34 is laminated on the shield layer 31.

The counter electrode ET is arranged in the active area ACT. The counter electrode ET extends on the color filter layer 34. In the active area ACT, the counter electrode ET faces the pixel electrode EP of each pixel PX. The counter electrode ET is covered with a second alignment film 36.

In addition, although the color filter layer 34 is arranged on the counter substrate CT, the color filter layer 34 may be formed on the array substrate AR. In this case, it is possible to replace the second interlayer insulating film 18 in the array substrate AR by the color filter layer 34. Moreover, in order to smooth the concavo-convex of the surface of the color filter layer 34, a transparent overcoat layer may be arranged on the counter substrate CT between the color filter layer 34 and counter electrode ET.

The array substrate AR is equipped with a pillar-shaped spacer 21 in this embodiment. That is, the pillar-shaped spacer 21 is formed on the array substrate AR facing the counter substrate CT in the active area ACT. The pillar-shaped spacer 21 is formed on the second interlayer insulating film 18 in the array substrate AR. The pillar-shaped spacer 21 is covered with the first alignment film 20.

The pillar-shaped spacer 21 is provided in a non-displaying portion which does not contribute to the display in the active area ACT, i.e., the intersection portion of the gate line and source line which are located between pixel PXs, or right above the source line, the gate line, an auxiliary capacity line, the switching element SW, etc, which are not illustrated. The pillar-shaped spacer 21 is formed of various resin materials, such as UV-curable resin and thermosetting resin, for example.

The array substrate AR and counter substrate CT mentioned above are arranged so that the first alignment film 20 may oppose the second alignment film 36. At this time, a predetermined cell gap is formed between the array substrate AR and counter substrate CT by the pillar-shaped spacer 21. The liquid crystal layer LQ is held at the cell gap formed by the pillar-shaped spacer 21.

In addition, the composition of the liquid crystal display panel LPN is not limited to that shown in FIG. 2, and the counter electrode ET may be formed on the same substrate in which the pixel electrode EP is formed, i.e., the array substrate AR. Regarding liquid crystal operation mode, there is no limitation, and modes mainly using vertical electric field, such as TN (Twisted Nematic) mode, OCB (Optically Compensated Bend) mode, and VA (Vertical Aligned) mode, and modes mainly using lateral electric field, such as IPS (In-Plane Switching) mode and FFS (Fringe Field Switching) mode are applicable.

Moreover, although an optical element which contains a polarizing plate is arranged on at least one external surface of the liquid crystal display panel LPN, i.e., the external surface of the array substrate AR or the external surface of the counter substrate CT, the illustration is omitted here.

Figure 3:
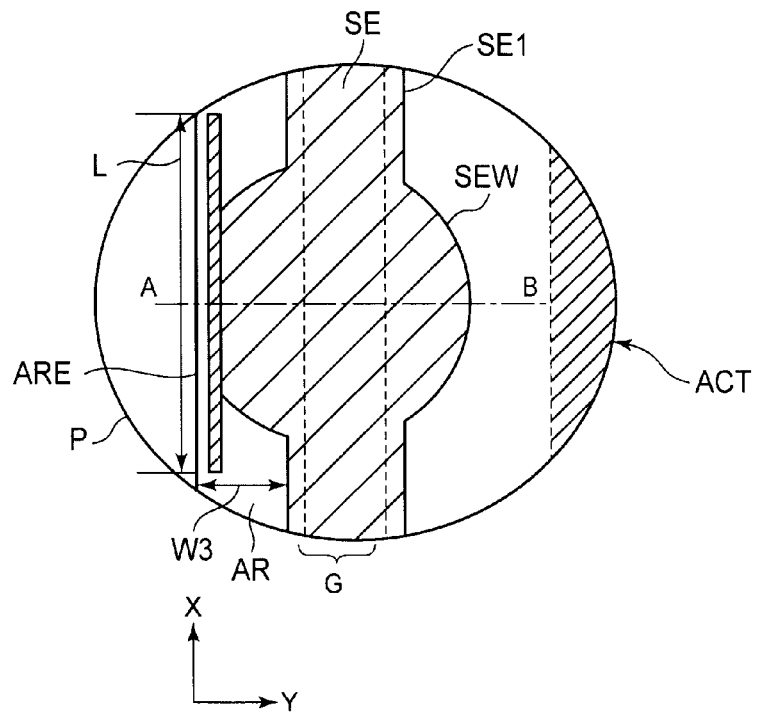
FIG. 3 is a plan view schematically showing a region P of the liquid crystal display panel shown in FIG. 1 by expanding according to a first embodiment.
Figure 4:
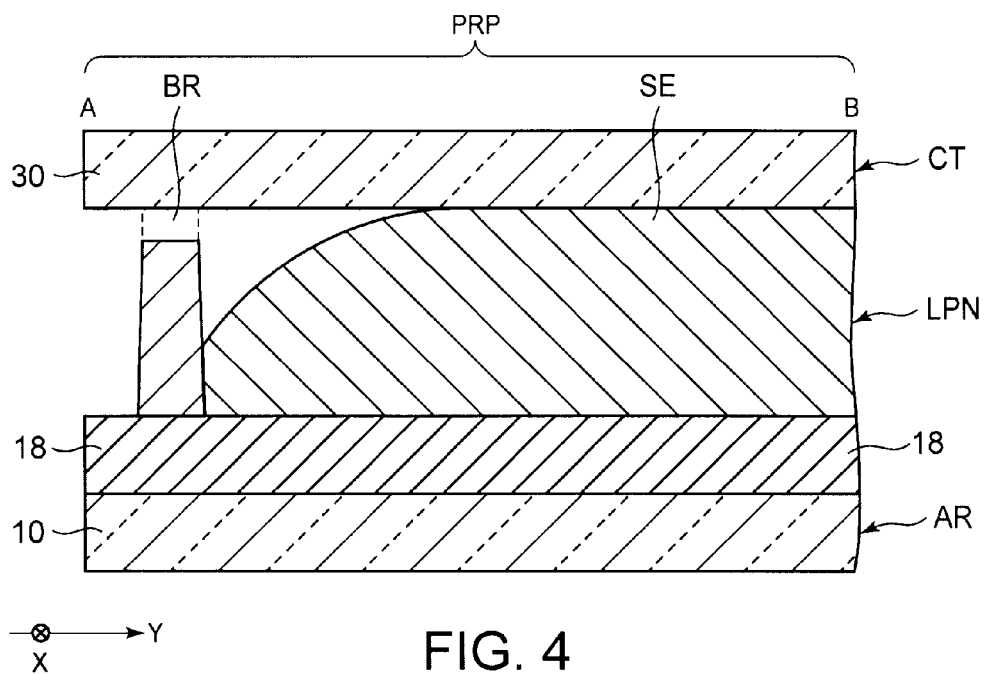
FIG. 4 is a cross-sectional view schematically showing the liquid crystal display panel shown in FIG. 3 taken along line A-B.

FIG. 3 is a plan view schematically showing the region P of the liquid crystal display panel shown in FIG. 1 by expanding according to a first embodiment. Here, the counter substrate is not shown. FIG. 4 is a cross-sectional view schematically showing the liquid crystal display panel shown in FIG. 3 taken along line A-B.

The array substrate AR is equipped with one barrier BR in the illustrated example. The barrier BR is arranged between the position in which the expanded portion SEW of the seal material SE is formed and the end ARE of the array substrate AR.

The barrier BR extends approximately in parallel with the first straight line portion SE1 of the seal material SE, i.e., in the first direction X.

Moreover, the barrier BR is formed on the second interlayer insulating film 18 in the array substrate AR. Although not illustrated, the barrier BR is formed of same various resin materials as the pillar-shaped spacer similarly formed on the second interlayer insulating film 18, such as UV-curable resin and thermosetting resin. For this reason, the barrier BR can be formed by the same process as the pillar-shaped spacer.

The barrier BR is apart from the counter substrate CT forming a clearance therebetween. The counter substrate CT is equipped with neither the shield layer nor the color filter layer at a surface opposing the barrier BR in the peripheral area PRP. That is, the barrier BR opposes the second insulating substrate 30.

Accordingly, in the active area ACT which is not illustrated, while the pillar-shaped spacer 21 is formed on the array substrate AR through the first alignment film 20 and second alignment film 36 so as to contact with the counter substrate CT, the barrier BR is formed on the array substrate AR facing the second insulating substrate 30 of the counter substrate CT without contacting the counter substrate CT in the peripheral area PRP. A clearance is formed between the barrier BR and the second insulating substrate 30. However, the barrier BR may contact with the second insulating substrate 30 as shown in a broken line in the figure.

Although the first straight line portion SE1 of the seal material SE does not contact the barrier BR, the expanded portion SEW contacts the barrier BR. In the illustrated example, a portion of the seal material SE at the expanded portion is blocked with the barrier BR.

Immediately after disposing the seal material SE on the array substrate AR, the seal material SE is located inside the barrier BR. When the counter substrate CT is pasted together to the array substrate AR, the seal material SE is crushed and spreads both in the active area ACT side and array substrate end ARE side.

Since, especially, the region between the barrier BR and active area ACT corresponds to the overlapped portion containing the starting portion and terminal portion at the time of drawing the seal material SE, the disposed amount of the seal material SE at the overlapped region is larger than that disposed on the other portions. Accordingly, the seal material SE at the overlapped portion spreads more greatly than the other portions, and serves as the expanded portion SEW.

At this time, the seal material SE runs against the barrier BR, and spreads in the first direction X along with the barrier BR. Accordingly, it is prevented the excess seal material SE from flowing into the end ARE of the array substrate AR. If the barrier BR contacts the second substrate 30 without a clearance, the excess seal material SE can be blocked more certainly.

Figure 5:
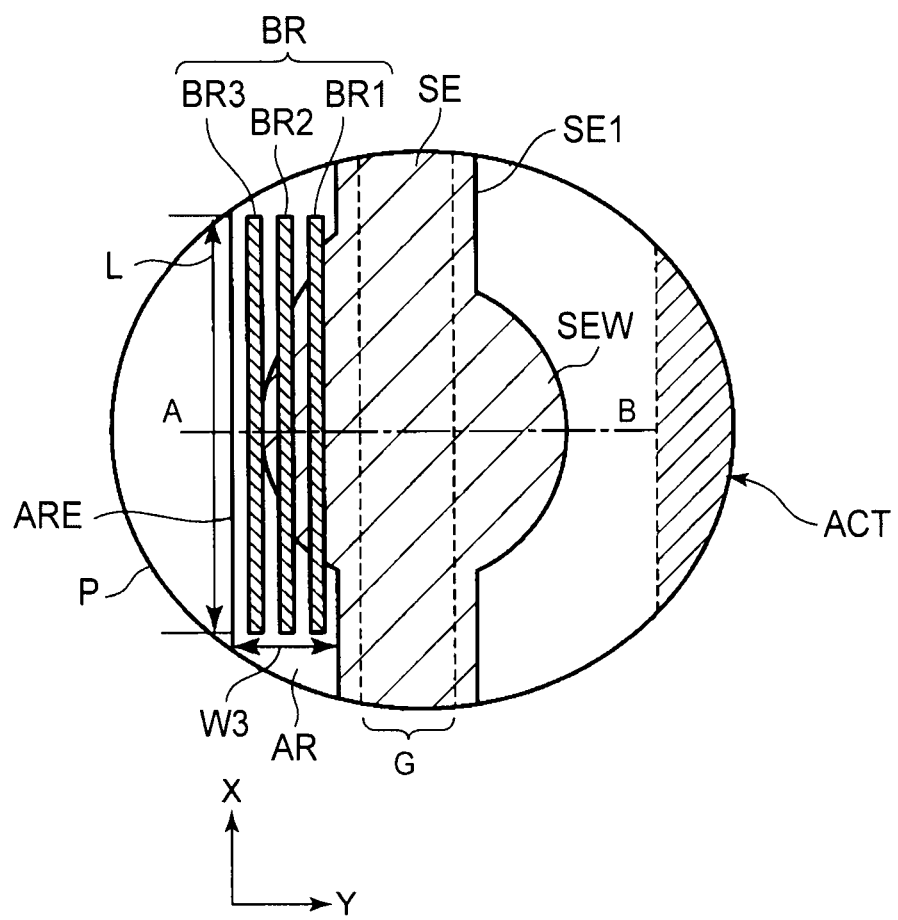
FIG. 5 is a plan view schematically showing the region P of the liquid crystal display panel shown in FIG. 1 by expanding according to a second embodiment.
Figure 6:
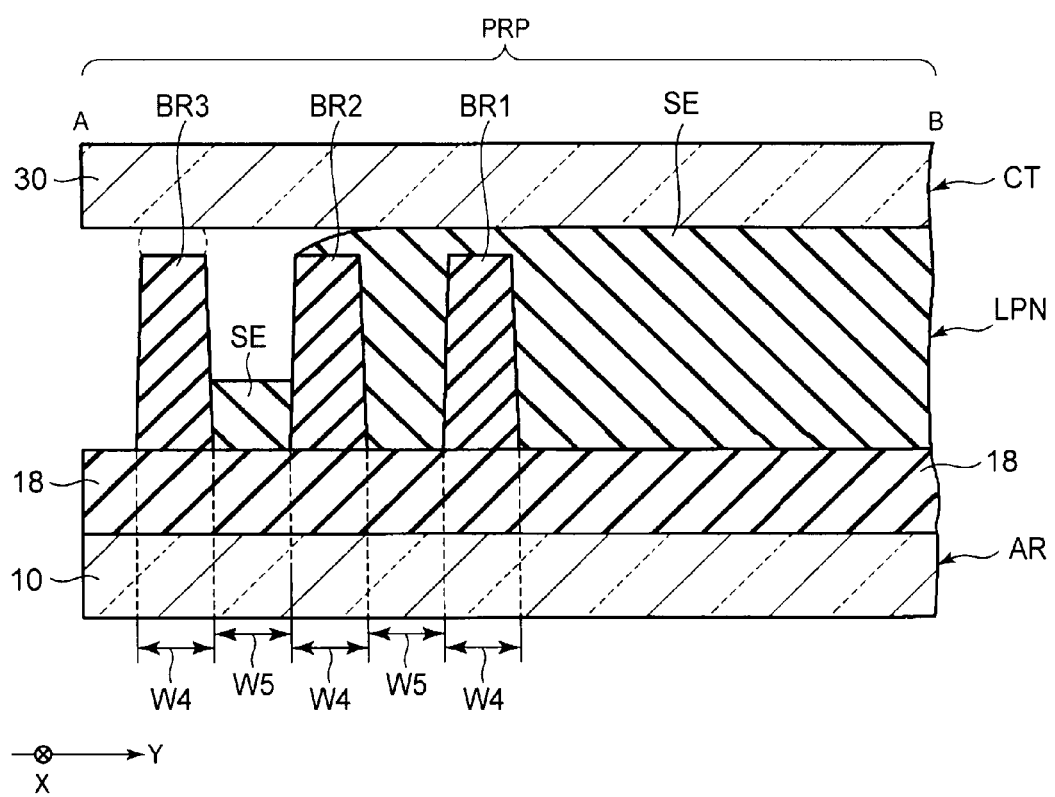
FIG. 6 is a cross-sectional view schematically showing the liquid crystal display panel shown in FIG. 5 taken along line A-B.

FIG. 5 is a plan view schematically showing the region P of the liquid crystal display panel shown in FIG. 1 by expanding according to a second embodiment. FIG. 6 is a cross-sectional view schematically showing the liquid crystal display panel shown in FIG. 5 taken along line A-B.

In this embodiment, the array substrate AR is equipped with two or more barriers BR. In this embodiment, the array substrate AR is equipped with three barriers, i.e., first barrier BR1, second barrier BR2 and third barrier BR3 in the illustrated example. The first barrier BR1 is arranged between a position in which the expanded portion SEW of the seal material SE is formed and the end ARE of array substrate AR. The second barrier BR2 is arranged between the first barrier BR1 and the end ARE of the array substrate AR. The third barrier BR3 is arranged between the second barrier BR2 and the end ARE of the array substrate AR.

The first to third barriers BR1-BR3 extend approximately in parallel with the first straight line portion SE1 of the seal material SE. That is, the first to third barriers BR1-BR3 extend in the first direction X, and are lined in the second direction Y.

The first to third barriers BR1-BR3 are formed on the second interlayer insulating film 18 in the array substrate AR. The first to third barriers BR1-BR3 are formed using the same material, for example, UV-curable resin and thermosetting resin as the pillar-shaped spacer. Accordingly, the first to third barriers BR1-BR3 can be formed using the same process as the pillar-shaped spacer. The first to third barriers BR1-BR3 are apart from the counter substrate CT forming a clearance.

In the active area ACT which is not illustrated, while the pillar-shaped spacer 21 in the array substrate AR contacts the counter substrate CT through the first alignment film 20 and second alignment film 36, the first to third barriers BR1-BR3 on the array substrate AR do not contact the second insulating substrate 30 of the counter substrate CT in the peripheral area PRP as illustrated. That is, a clearance is formed between the first to third barriers BR1 to BR3 and the second insulating substrate 30.

Although the first straight line portion SE1 of the seal material SE does not contact the first barrier BR1, the expanded portion SEW contacts the first barrier BR1. In the illustrated example, a portion of the seal material SE is held between the first barrier BR1 and second barrier BR2 beyond the first barrier BR1. Moreover, a portion of the seal material SE is held between the second barrier BR2 and third barrier BR3 beyond the second barrier BR2. However, the seal material SE does not reach to the end ARE of the array substrate AR. In addition, the held amount of the seal material SE between the second barrier BR2 and third barrier BR3 is smaller than that held between the first barrier BR1 and second barrier BR2.

Immediately after disposing such seal material SE on the array substrate AR, the seal material SE is located inside the first barrier BR1. When the counter substrate CT is pasted together to the array substrate AR, the seal material SE is crushed and spreads both in the active area ACT side and array substrate end ARE side.

At this time, the seal material SE spreading toward the array substrate end ARE side runs against the first barrier BR1, and spreads in the first direction X along with the first barrier BR1. A portion of the seal material SE exceeds the first barrier BR1, and flows into the space between the first barrier BR1 and second barrier BR2. Further, the seal material SE flowing into the space between the first barrier BR1 and the second barrier BR2 exceeds the second barrier BR2, and spreads in the first direction X along with the second barrier BR2. A portion of the seal material SE exceeds the second barrier BR2, and flows into the space between the second barrier BR2 and third barrier BR3. The seal material SE flowing into the space between the second barrier BR2 and third barrier BR3 is blocked by the third barrier BR3. The amount of the seal material SE flowing toward the end ARE of the array substrate AR is reducing as goes to the end ARE in the illustrated example.

In addition, although the seal material SE is held, respectively between the first barrier BR1 and second barrier BR2, and between the second barrier BR2 and third barrier BR3 in this example, the seal material SE may be held only between the first barrier BR1 and second barrier BR2, or the seal material SE may be held neither between the first barrier BR1 and second barrier BR2 nor between the second barrier BR2 and third barrier BR3. Furthermore, the barrier BR arranged at the closest portion to the end ARE of the array substrate AR, i.e., the third barrier BR3 may contact with second substrate 30 without a clearance as shown in a broken line in FIG. 6. According to such arrangement, the seal material SE is blocked more certainly without flowing to the end ARE.

In this embodiment, although the array substrate AR is equipped with three barriers (BR1 to BR3), the number of the barriers is not limited to this number. For example, the array substrate AR may be equipped with four or more barriers in the case where the width W3 from the end ARE to the seal material SE on the array substrate AR is large enough.

An example of a size of the arrangement is described below. The width W3 between the end ARE of the array substrate AR and the first straight line portion SE1 of the seal material SE is 300 μm-400 μm, for example. In addition, the distance between the end ARE of the array substrate AR and center of the seal material SE is 600 μm-700 μm. Each width W4 of the first to third barriers BR1-BR3 is about 20 μm, for example. Each interval W5 between the first barrier BR1 and second barrier BR2, and between the second barrier BR2 and third barrier BR3 is about 50 μm, for example. Moreover, the respective length L extending in the first direction X of the first to third barriers BR1-BR3 is about 3 mm, for example.

According to this embodiment, even if the overlapped portion of the seal material SE is formed more thickly than the originally designed line width of the seal material SE, the spread of the seal material SE toward the end ARE of the array substrate AR can be suppressed with two or more barriers BR. Particularly, also even in the narrow frame type liquid crystal display panel LPN in which the distance between the end ARE of array substrate AR and the seal material SE is comparatively small, it becomes possible to control a local spread of the seal material SE.

According to this embodiment, two or more barriers BR extend in the parallel direction with the straight line portion of the seal material SE (in the example shown in FIG. 5, the first direction X parallel with the first straight line portion SE1). That is, the barriers BR extend orthogonally in the direction to which the seal material SE spreads (second direction Y in the example shown in FIG. 5). Therefore, even if the disposed amount of the seal material SE increases, it becomes possible to suppress the spread of the seal material SE. Furthermore, even if a portion of the seal material SE which exceeds one of the barriers BR, the spread of the seal material SE can be controlled with other barriers BR located outside thereof.

Since the amount of the seal material SE flowing toward the end ARE can be reduced as toward the end ARE of the array substrate AR from the position where the seal material SE is disposed, the amount of the seal material SE held between the barriers close to the end ARE is smaller than that at the position where the seal material SE is disposed.

Figure 7:
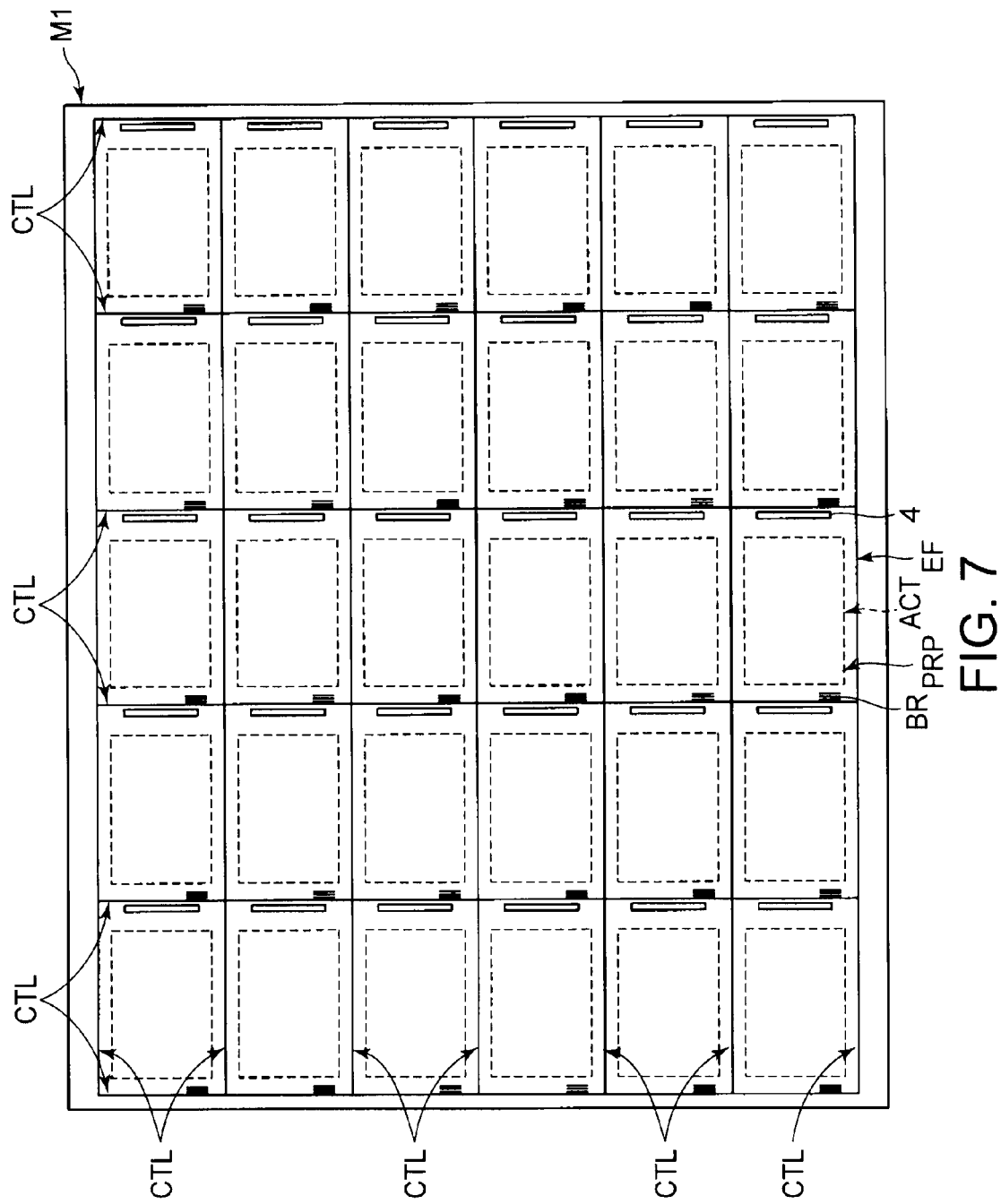
FIG. 7 is a view for explaining a manufacturing method of the liquid crystal display panel according to the embodiment, and in detail is a plan view for explaining a process of preparing a first mother substrate.

Next, the manufacturing method of the above-mentioned liquid crystal display panel LPN is explained. First, as shown in FIG. 7, a first mother substrate M1 is prepared to form the array substrate AR. Effective regions EF for forming a plurality of the individual array substrates AR are formed on the first mother substrate M1. In this embodiment, although the first mother substrate M1 has 30 effective regions (5×6) EF, the number of the effective regions EF is not limited to this figure.

Moreover, "CTL" in the illustrated first mother substrate M1 is a planned cut line to cut the first mother substrate M1 when individual array substrates AR are taken from the first mother substrate M1. That is, the effective region EF is a region surrounded by the planned cut lines CTL.

The first mother substrate M1 is formed using an insulating substrate i.e., the first insulating substrate 10. Each of the effective regions EF includes various insulating films such as the second interlayer insulating film 18, the pillar-shaped spacer 21 and barriers BR respectively formed on the second interlayer insulating film 18, the switching element SW, the pixel electrode EP, the driver IC chip 2, and the mounting portion 4 to equip the flexible wiring substrate 3 though not illustrated in detail. The pillar-shaped spacer 21, the switching element SW, the pixel electrode EP, etc. are formed in the active area ACT. The barrier BR, the mounting portion 4, etc. are formed in the peripheral area PRP.

Then, although not illustrated, a second mother substrate M2 for forming the counter substrate CT is prepared. The second mother substrate M2 is approximately same size as the first mother substrate M1. The second mother substrate M2 also includes the planned cut lines CTL to cut the second mother substrate M2 when taking the individual counter substrates CT from the second mother substrate M2.

Figure 8:
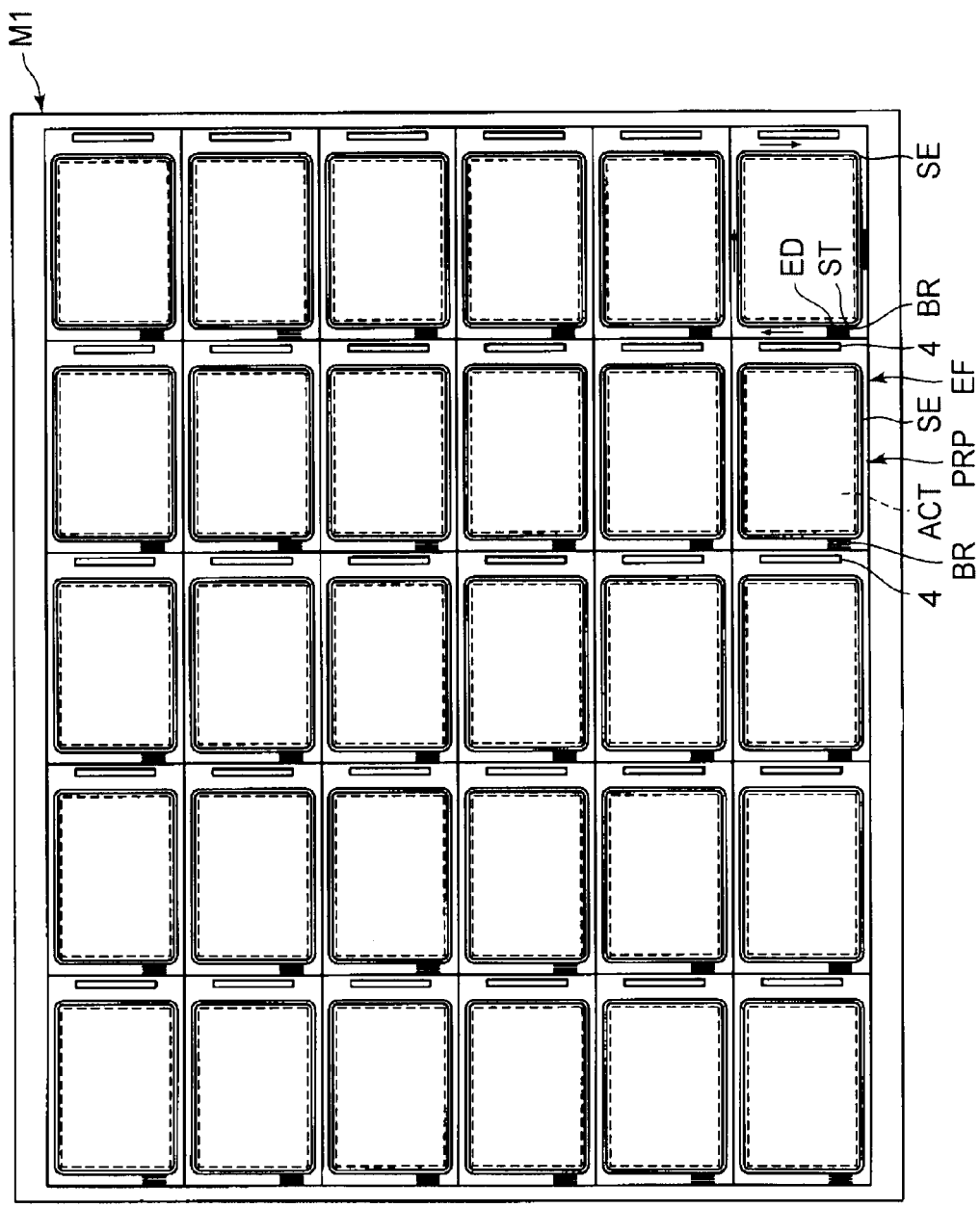
FIG. 8 is a view for explaining the manufacturing method of the liquid crystal display panel according to the embodiment, and in detail is a plan view for explaining a process of disposing seal material on the first mother substrate.

Successively, the seal element SE in a closed loop of an approximately rectangle frame is disposed in the respective effective regions EF on the first mother substrate M1, as shown in FIG. 8 using a dispenser device so that the starting portion ST and terminal portion ED of the disposing of the seal material SE are located between the barrier BR and the active area ACT as shown in an arrow in the figure. In this embodiment, the terminal portion ED is in a position beyond the starting portion ST in the second direction X, and the overlapped portion of the seal material SE is formed between the starting portion ST and terminal portion ED. Thus, disconnection of the seal material SE can be prevented by disposing the seal material SE as explained above.

Figure 9:
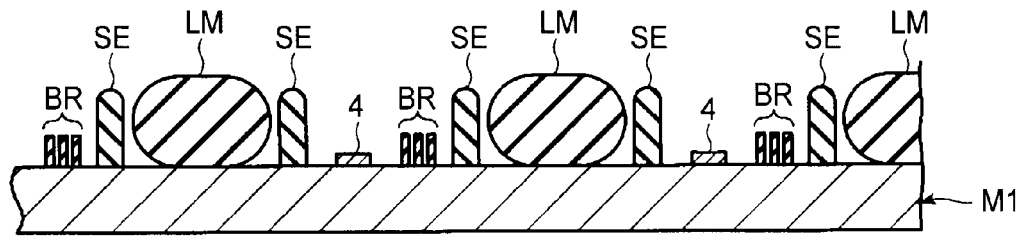
FIG. 9 is a view for explaining the manufacturing method of the liquid crystal display panel according to the embodiment, and in detail is a plan view for explaining a process of dropping liquid crystal material on the first mother substrate.

Then, as shown in FIG. 9, the liquid crystal material LM is dropped at the inner side surrounded by the seal material SE for each of the effective regions EF on the first mother substrate M1 using ODF (One Drop Fill) method. At this time, the liquid crystal material LM is arranged on the first alignment film 20 of each effective region EF.

Figure 10:
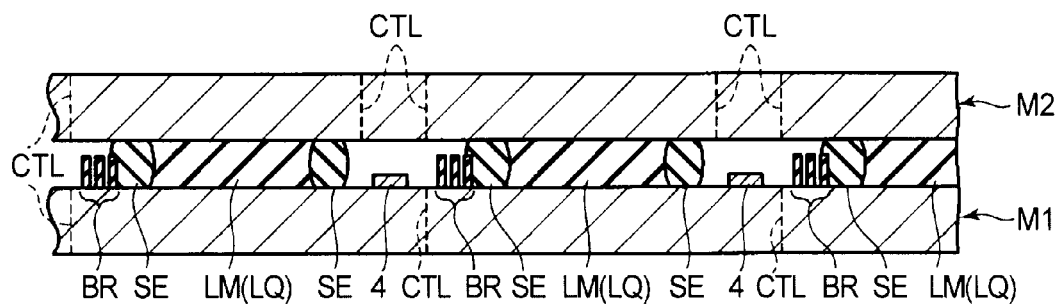
FIG. 10 is a view for explaining the manufacturing method of the liquid crystal display panel according to the embodiment, and in detail is a plan view for explaining a process of attaching the first mother substrate and second mother substrate.

Successively, as shown in FIG. 10, the second mother substrate M2 is arranged on the seal material SE and liquid crystal material LM in the first mother substrate M1, and pressure is applied between the first mother substrate M1 and second mother substrate M2 so that a predetermined cell gap may be formed therebetween. While the second mother substrate M2 is supported by the pillar-shaped spacer 21 in each of the effective regions EF at this time, the seal material SE is crushed and the liquid crystal material LM spreads in the inner side surrounded by the seal material SE. Then, while pasting together the first mother substrate M1 and second mother substrate M2 by curing the seal material SE in each of the effective region EF, the liquid crystal layer LQ is formed between the first mother substrate M1 and second mother substrate M2.

At this time, the spread of the seal material SE near the barrier where the disposed amount increases more than other locations is controlled with the barrier BR. For this reason, it becomes possible to control the spread of the seal material SE to the planned cut lines CTL of both sides of the first mother substrate M1 and second mother substrate M2.

Figure 11:
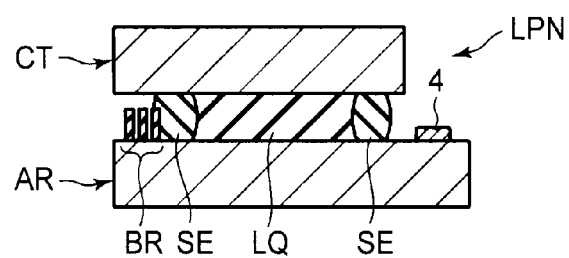
FIG. 11 is a view for explaining the manufacturing method of the liquid crystal display panel according to the embodiment, and in detail is a plan view for explaining a process of having cut the mother substrates to form individual liquid crystal display panels.

Then, the both of the first mother substrate M1 and second mother substrate M2 are cut along the planned cut lines CTL. Thereby, as shown in FIG. 11, while each array substrate AR and counter substrate CT are respectively cut from the first and second mother substrates M1 and M2, the individual liquid crystal display panel LPN holding the liquid crystal layer LQ therebetween is manufactured.

Thus, when the disposed seal material SE spreads, after reaching to the planned cut lines CTL, further overflowing of the seal material SE into the adjacent effective region EF is controlled. Therefore, when cutting the mother substrates M1 and M2 along the planned cut lines CTL, it becomes possible to control the generation of the cutting default resulting from the straddling of the seal material SE on the planned cut lines CTL.

Particularly, in the liquid crystal display panel LPN of a narrow frame specification, the first mother substrate M1 and second mother substrate M2 can be cut along the planned cut lines CTL without generating the cut default, even if the disposed amount of the seal material SE at the expanded portion increases more than other portions.

As explained above, according to this embodiment, the liquid crystal display device and its manufacturing method which can control the fall of the manufacturing yield can be provided.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:
1. A liquid crystal display device, comprising:
a first substrate including an active area and a peripheral area surrounding the active area;
a second substrate opposing the first substrate;
a seal material formed in the peripheral area on the first substrate surrounding the active area to attach the first substrate and second substrate with a predetermined cell gap therebetween, the seal material formed in an approximately rectangular closed loop shape having four straight line portions and including an expanded portion in which the width of one of the line portions is locally expanded; and
a barrier arranged between the location where the expanded portion is formed and one end of the first substrate; wherein,
the expanded portion of the seal material is formed in a portion where a starting portion of a drawing of the seal material overlaps with a terminal portion of the drawing,
the first substrate includes an insulating substrate, an insulating film formed on the insulating substrate, and a pillar-shaped spacer formed on the insulating film in the active area to make a cell gap, and
the barrier is formed on the insulating film by a same material as the pillar-shaped spacer and extends approximately in parallel with the straight line portion of the seal material.
2. The liquid crystal display device according to claim 1, wherein the barrier is arranged apart from the second substrate so as to form a clearance between the barrier and second substrate.

3. The liquid crystal display device according to claim 1, wherein the barrier is arranged so as to contact with the second substrate without forming a clearance.

4. A liquid crystal display device, comprising:
   a first substrate including an active area and a peripheral area surrounding the active area;
   a second substrate opposing the first substrate;
   a seal material formed in the peripheral area on the first substrate surrounding the active area to attach the first substrate and second substrate with a predetermined cell gap therebetween, the seal material formed in an approximately rectangular closed loop shape having four straight line portions and including an expanded portion in which the width of one of the line portions is locally expanded;
   a first barrier arranged between the location where the expanded portion is formed and one end of the first substrate; and
   a second barrier arranged between the first barrier and the end of the first substrate,
   wherein the expanded portion of the seal material is formed in a portion where a starting portion of a drawing of the seal material overlaps with a terminal portion of the drawing,
   the first substrate includes an insulating substrate, an insulating film formed on the insulating substrate, and a pillar-shaped spacer formed in the active area on the insulating film to make a cell gap, and
   the first and second barriers are formed on the insulating film by a same material as the pillar-shaped spacer and extends approximately in parallel with the straight line portion of the seal material.

5. The liquid crystal display device according to claim 4, wherein the first and second barriers are arranged apart from the second substrate so as to form a clearance between the barriers and the second substrate.

6. The liquid crystal display device according to claim 4, wherein the first barrier is arranged apart from the second substrate so as to form a clearance between the first barrier and the second substrate, and the second barrier is arranged so as to contact with the second substrate without forming a clearance.

7. The liquid crystal display device according to claim 4, wherein the barrier further includes a third barrier arranged between the end of the first substrate and the second barrier, and the seal material held between the second barrier and third barrier is smaller than that held between the first barrier and second barrier.

8. The liquid crystal display device according to claim 7, wherein the third barrier contacts with the second substrate without forming a clearance while the first and second barriers are apart from the second substrate forming a clearance.

9. A method of manufacturing a liquid crystal display device, comprising the steps:
   preparing a first substrate including an insulating substrate, an insulating film formed on the insulating substrate, a pillar-shaped spacer formed on the insulating film in an active area to display image, and a barrier formed on the insulating film in a peripheral area located outside of the active area;
   drawing a seal material to form an approximately rectangle frame-like closed loop on the first substrate from a starting portion to a terminal portion arranged in the peripheral area;
   dropping liquid crystal material in an inside area surrounded with the seal material;
   arranging the second substrate on the seal material and liquid crystal material; and
   attaching the first and second substrates by curing the seal material while holding the liquid crystal material therebetween, wherein
   the starting portion and the terminal portion of the drawing of the seal material form an overlapped portion, and an expanded portion of the seal material is formed in the overlapped portion in drawing the seal material in a closed loop, and
   the barrier includes a first barrier arranged between the location where the expanded portion of the seal material is formed and one end of the first substrate, and a second barrier arranged between the first barrier and the end of the first substrate.

10. The method of manufacturing a liquid crystal display device according to claim 9, wherein the first and second barriers are arranged apart from the second substrate so as to form a clearance between the first and second barriers and the second substrate.

11. The method of manufacturing a liquid crystal display device according to claim 9, wherein the second barrier contacts with the second substrate.

* * * * *